United States Patent [19]

Hagan et al.

[11] Patent Number: 5,643,649
[45] Date of Patent: Jul. 1, 1997

[54] METHOD FOR IMPROVING THE FLATNESS OF GLASS DISK SUBSTRATES

[75] Inventors: James A. Hagan; Douglas H. Piltingsrud; Steven F. Starcke; Bradley J. Offuh; Dennis L. Fox, all of Rochester, Minn.

[73] Assignee: International Business Machines Corporation, Armonk, N.Y.

[21] Appl. No.: 507,034

[22] Filed: Jul. 31, 1995

[51] Int. Cl.[6] ............................................. B32B 3/00
[52] U.S. Cl. ..................... 428/64.1; 428/64.2; 428/426; 428/432; 428/913; 65/33.1; 65/102; 65/104; 65/111; 65/117
[58] Field of Search ............................ 428/64.1, 64.2, 428/426, 432, 913; 65/29.1, 33.1, 102, 104, 111, 117

[56] References Cited

U.S. PATENT DOCUMENTS

| | | |
|---|---|---|
| 3,844,757 | 10/1974 | Kaufman et al. ............... 65/114 |
| 3,883,339 | 5/1975 | Michalik et al. ............... 65/114 |
| 4,102,664 | 7/1978 | Dumbaugh, Jr. ............... 65/23 |
| 4,111,675 | 9/1978 | Ballard ............... 65/114 |
| 4,566,893 | 1/1986 | Hopkins et al. ............... 65/69 |
| 5,009,694 | 4/1991 | Nishitani et al. ............... 65/115 |
| 5,015,426 | 5/1991 | Maus et al. ............... 264/40.5 |
| 5,193,037 | 3/1993 | Pace ............... 360/106 |
| 5,278,709 | 1/1994 | Thornton et al. ............... 360/97.01 |
| 5,342,426 | 8/1994 | Dumbaugh, Jr. ............... 65/23 |
| 5,351,156 | 9/1994 | Gregory et al. ............... 360/74.1 |

Primary Examiner—Patrick Ryan
Assistant Examiner—Elizabeth Evans
Attorney, Agent, or Firm—Merchant, Gould, Smith, Edell, Welter & Schmidt

[57] ABSTRACT

The invention is a method for improving the flatness of nonmetallic substrates and preferably glass disks. The method comprises the steps of mounting the glass disk on a support. The support preferably comprises a refractory metal having a cooling rate substantially similar to the disk. The disk is then subjected to heating to a temperature in the anneal region for the given material for a period ranging from about 0.5 hours to 12 hours or longer, and then the disk is controllably cooled. The glass disk is preferably cooled at a rate of about 0.25° C./minute to 1.5° C./minute to room temperature. The invention also comprises a hard disk glass memory element and a data storage and retrieval device comprising this element.

21 Claims, 6 Drawing Sheets

METHOD FOR IMPROVING THE FLATNESS OF GLASS DISK SUBSTRATES

FIELD OF THE INVENTION

The invention generally relates to methods for improving the physical properties of nonmetallic substrates. More specifically, the invention relates to methods for improving the surface flatness and overall shape of nonmetallic substrates such as those used in hard disk data storage elements composed of glass, glass/ceramic, as well as any number of other nonmetallic materials.

BACKGROUND OF THE INVENTION

In the computer industry, hard disk data storage elements or memory are generally made from aluminum or an aluminum alloy. These hard disk memory components have certain properties or characteristics which make them commercially practicable products. For example, hard disk components should be flat and smooth or have an ability to be super finished to near atomic smoothness. The disk should also be free of defects such as holes, pits, digs, scratches and mounds. The disk should also be thin so that as many disks as possible can be packaged or placed in a disk drive.

Fabricating a disk which is thin and has a low mass is also easier on the drive motor. The disk should also be hard and quite stiff. High stiffness, as measured by the modulus of elasticity, allows the disk to avoid harmonic vibration. One other attribute that the disks preferably have is a lower cost. With an increasing emphasis towards higher quality and lower cost, various alternative disk substrates have been explored.

One alternative to aluminum substrates for hard disks is the use of nonmetallic materials such as glass, and glass/ceramic. Various methods have been developed for processing these materials to improve physical and mechanical properties such as tempering the substrate to increase strength. Glass tempering is usually regarded as the strengthening of glass through the variable cooling of the material, e.g. cooling the outside of the substrate more quickly than the inside.

For example, Michalik et al, U.S. Pat. No. 3,883,339 teaches the tempering glass sheets while they are clamped and vertically suspended first during heating and then cooling. Kaufman et al, U.S. Pat. No. 3,844,757 teaches a method of heating the glass sheet clamped and vertically suspended in a furnace. Ballard, U.S. Pat. No. 4,111,675 teaches the vertical suspension of glass sheets in a fluidized bed during heat exchange.

Nishitani et al, U.S. Pat. No. 5,009,694 teaches a method of heat treating glass plates to strengthen the peripheral regions of the plates. Further, Dumbaugh, Jr., U.S. Pat. Nos. 4,102,664 and 5,342,426 disclose methods of producing glass sheets for use in various applications by requiring alkali metal free glass. Finally, Hopkins et al, U.S. Pat. No. 4,566,893 provides a method for the film processing and annealing of glass CRT panels.

The trend in personal computers towards compact or notebook size computers has led to a need for greater data memory and durability. Increased memory and durability comes with the use of a hard drive having a higher structural integrity and physical quality as well as the ability to place higher densities on the drive. Additionally, economies of scale, require cost-effective higher performing hard drives.

As a result, the need for disks of higher structural integrity and physical properties as well as the need for higher data densities and cost-effective higher performance has lead to a need for hard drives having significant improvements. Glass is one exemplary substrate which provides significant advantages of durability, hardness and surface finish. But glass is hard and expensive to process, that is to edge properly and get flat. Flatness improvements are necessary for smaller head disk spacing and reduced signal to noise ratio.

Thus there is a need for improved methods of processing nonmetallic disks to increase structural integrity, physical properties, data storage capacity, and miniaturization.

SUMMARY OF THE INVENTION

In accordance with a first aspect of the invention there is provided a method for improving the flatness of nonmetallic substrates. The method comprises the steps of placing the substrate on a support. The substrate is heated to a temperature and for a time sufficient to relieve the stresses within the substrate and then controllably cooled. Cooling is completed at a rate which allows the substrate and support to cool at substantially the same rate.

In accordance with a preferred aspect of the invention, there is provided a method for improving the flatness of a glass disk. The method comprises the steps of mounting the glass disk on a support. The support comprises a refractory metal having a cooling rate which is matched or at least substantially similar to the disk. The disk is heated to the annealing region for the substrate material for a period ranging from about 2 hours to 12 hours, and then cooled at a rate of about 0.25° C./minute to 1.5° C./minute to room temperature.

In accordance with a further preferred aspect of the invention there is provided a hard disk memory element comprising a nonmetallic material. The memory element has a flatness measured by a total indicated run out ranging from about 1 μm to 6 μm and a cone height ranging from about 1 μm to 6 μm.

In accordance with a further aspect of the invention, there is provided a data storage and retrieval device comprising the hard disk memory element resulting from the method of the invention.

The invention is intended to increase the flatness of any nonmetallic substrate or disk to which it is applied. In the context of the invention, nonmetallic means not 100% metal. Substrates having less than 100% metal atoms may be considered nonmetallic. Flatness is determined by two parameters, total indicated run out (TIR) and cone height. The total indicated run out is calculated by subtracting the maximum-minimum height for each side of the disk. This provides a TIR for each side of the disk.

The cone height of the disk is calculated by taking the average of at least four readings for each side of the disk and then subtracting the average reading from the disk first side from the average reading from the disk second side. Positive and negative numbers are used to indicate the direction of coning. To calculate the average cone height of a batch of disk parts, the absolute value of the positive and negative numbers is used. The smaller the TIR and the smaller the cone height, the flatter the disk. TIR and Coning are caused by permanent stresses in the glass, but those skilled in the art of glass stress measurement by the accepted standard optical methods do not find any measurable stress. This is because the levels of stress dealt with by the invention deal in a new arena non-obvious to the existing glass industry.

The invention is intended to relieve molecular stresses which are created by any number of processing procedures.

These molecular stresses are often thought to be created due to changes in atomic position, structure, or density due to mechanical etching, casting, machining, patterning, heating and cooling, handling, and the like. In most instances, the materials cool from the outside through to the inside and the resulting thermal difference creates physical and molecular perturbations which in turn, induce stress.

The invention is applicable to any thermo-plastic materials which soften upon heating without memory and become locked into stressed conditions when subjected to machining or thermal processing. In the context of this invention, the term stress is defined as internal atomic and mechanical forces capable of inducing or creating warpage in the stressed component.

Glass is made by melting its component parts together then cooling the mixture to a solid. As it passes from a liquid state to a solid it has induced in it, ordinary permanent strains or stresses. These are caused by differences in temperature in the glass as it cools (outer surface vs. interior or side to side). These stresses cause the raw glass substrates to be out of flat. For use as a disk the substrate must have a flatness of six microns or less ($\leq 6$ microns) when supplied to disk finishers where the magnetic and protective coatings are applied.

The cooling point at which the glass no longer suffers induced stress is called its strain point or lower limit annealing point. Differences in the glass temperature below this point induce no permanent stress nor will heating up to this point relieve strain as seen by standard optical detection. Stress relief is normally a function of time and temperature. Stress may be relieved or induced at any variety of temperatures given a certain material and variance of the time in relationship to this temperature.

Raw glass disk substrate blanks are glass substrates which have not been lapped, polished, or strengthened. However, these substrates are in the required dimensions for thickness, diameter, and hole size. Finishing steps of lapping for flatness and chemical strengthening must be done below the strain point in order not to induce new permanent stresses in the substrate. Thus the flatness problem is an inherent character of raw glass substrates and has to be corrected in the finishing steps.

The method of the invention provides for annealing the disks in such a way that the critical disk dimensions are retained, the thin disks do not break from transient thermal stresses, and their smooth surface finishes are not damaged. This is done in a hang anneal process where the disks are held in air on a low mass, arm at high temperatures for an extended period. The disks may then be cooled to room temperature under controlled conditions.

DETAILED DESCRIPTION OF THE INVENTION

Figure 1:
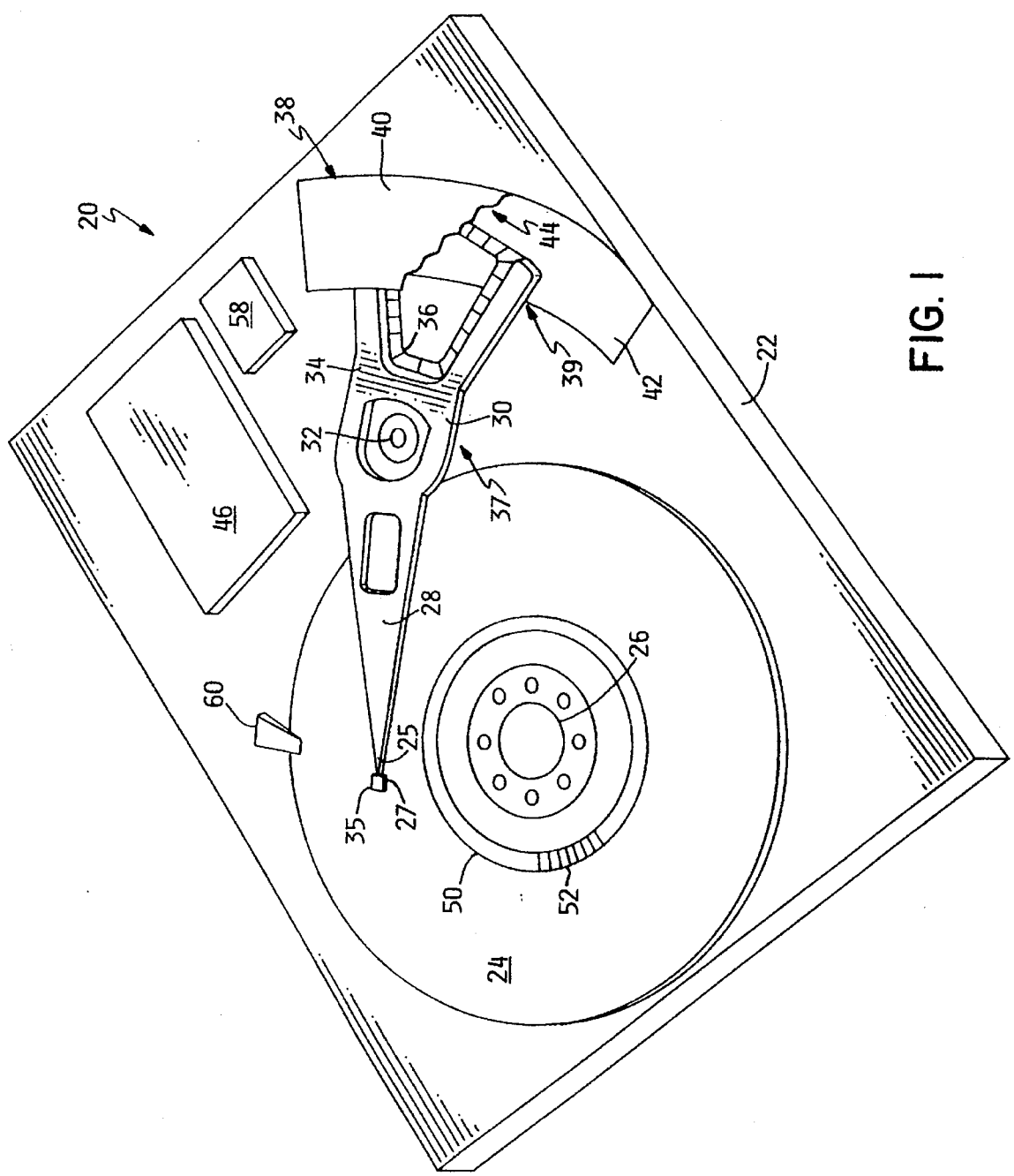
FIG. 1 is a top perspective view of a data storage system with its upper housing cover removed.

The invention is a method for improving the flatness of nonmetallic substrates. The method includes mounting the substrate such as a glass disk on a support. The support preferably is a refractory metal. The disks are then heated to their annealing range (which is preferably at least about 500±5° C. for a soda lime silicate glass) for a period ranging from about 2 hours to 12 hours, and then cooled. The glass disks are preferably cooled at a rate of about 0.25° C./minutes to 1.5° C./minutes to room temperature. The invention also includes a hard disk memory element made from the method of the invention and storage and retrieval devices comprise this hard disk memory element.

A. The Process

The process of the invention is initiated by the placement or mounting of the substrate on an appropriate support. The support functions to provide a low stress environment for the annealing of the substrate during heating. Further, the support also functions to provide a fluid, and even flow of heat throughout the heating environment.

Generally, the support may be any number of devices which when the substrate is cooled will not create stress or structural failure in the substrate. Among other factors, the differences in temperature between the support and substrate preferably are not significant during heating or cooling cycles. This prevents development of uneven hot and cool areas on the substrate. To this end, the support also minimizes heat transfer between the support and the substrate to be heated by having minimum contact with the substrate and minimum heat conductance.

Generally, any material designed to cool at the same rate as or substantially equivalent to the substrate may be used for the support. Generally, the oven or furnace cooling rate may be decreased to reduce the impact of the factors which affect the creation of stress or failure in the substrate.

Without wishing to be bound to any particular theory, we believe that cooling rate for any given material may depend upon the physical shape and thickness of the support material, the manner in which the substrate is positioned on the support, and the material itself used for the support. The physical shape of the support should be chosen to provide minimum contact area between the support and substrate. The thickness of the support should be minimized to lower the heat holding capacity of the material. The positioning of the substrate is preferably oriented to again reduce the contact area between the substrate and the support. Generally, the substrate should be positioned on the support to provide even cooling without the creation of hot and cold spots that create stress in the substrate material.

We believe that the use of support materials having a low mass together with minimizing the contact areas between the substrate and support results in minimal heat flow (Q) between the support and substrate. Generally, the relationship between the variables is:

$$Q = kA \frac{dT}{dx}$$

Wherein (A) is the area of contact between the substrate and support; (dx) is the length of heat flow; and (dT) is the change in temperature. By minimizing the thermal conductivity, k as well as A, the heat flow (Q) may be minimized thereby reducing heat flow between the substrate and support. In turn, (dt) is equal to the difference between the temperature of the support (Tsp) and the temperature of the substrate (Tsb): T=Tsp−Tsb. In turn, cooling rate is equal to the change in temperature (dT) divided by the change in time (dt).

Having read this disclosure, one of skill in the art will understand how to determine the cooling rate for a given support or substrate material composition, geometry, and contact area, among the other factors provided above. One method includes heating a material and depending upon geometry, contact area, etc. attaching a series of thermocouples to the material to gauge the cooling rate of the material after heating has been completed.

Generally, the support used in the method of the invention may comprise any number of materials including stainless steel, various ceramics, as well as any number of other materials including refractory metals. Exemplary refractory metals include those elemented or alloyed metals such as tantalum, niobium, zirconium, and titanium, as well as nickel based super alloys. In accordance with a preferred aspect of the invention, the support may be made of thin sheets (5 thousandths of an inch) of nickel/iron alloy available as Inconel® available from McMaster-Carr when soda lime silica glasses are being annealed. With the annealing of soda lime silica substrates, a difference in cooling rate between the substrate and an Inconel® support of from about 0° C./minute up to about 3° C./minute is believed to be substantially equivalent and to allow for a flatness of less than about 6 µm. Having read this specification, one of skill in the art will be able to determine the range of substantial equivalence for any given substrate and support materials.

The support may hold any number of disks, may be placed on any number of slots across the surface of the support. This mandrel preferably comprises Inconel®, and may be directly inserted into any oven which has timed heating and cooling. Here again, any configuration for the support of the disks may be used as long as the disks or substrates to be heated are not stacked so closely that the disks will adhere to one another. The support preferably also will not create permanent stress in the disk or substrate during cooling.

Once the disks have been placed upon the support as intended, they may then be heated. Heating may be undertaken in any heating unit which will provide for timed heat increase and decrease. Here again, the temperature and time of heating should be sufficient to release those molecular and mechanical stresses within the substrate as intended by the process of the invention.

Generally, the temperature of heating varies depending upon the composition of the substrate material. The heating of the substrate is a cycle which takes the material to the bottom or lower portion of the materials annealing region. The annealing region is generally defined by a lower temperature called the strain point. A materials strain point is the temperature which is the lower limit for inducing stresses through thermal processing. The upper temperature defining the annealing region is that temperature at which the material will loose physical integrity and geometry through uncontrollable flow. These terms are known to those of skill in the art. The strain and generally preferred annealing temperatures for various exemplary glasses may be seen below in Table 1:

TABLE 1

| Material | Strain (C.°) | Annealing (C.°) |
| --- | --- | --- |
| Sodium Soda Lime Silica | 473 | 514 |
| Alumino - silicate (Corning 88) | 574 | 622 |
| Alumino - silicate (Generally) | 667 | 712 |
| Alumino - Borosilicate | 529 | 569 |

Heating to anneal may take any time period ranging from about 0.5 hours to 6 hours or longer. Preferably, heating may be undertaken for a period of at least about 2 hours to 12 hours at temperatures slightly above and within the region between the materials strain point and the materials annealing temperature. The annealing temperature is generally about 15° C. to 50° C. above the strain point of the material depending upon material composition as known to those of skill in the art. We have found that these temperatures afford the optimal physical properties in the substrate allowing for increased flatness in the resulting article. Further, we have found flatness of less than about 6 µm, preferably about 1 to 3 µm, and generally about 2 µm on average.

Once the substrate has been heated for the appropriate period of time, it may then be cooled. We have found that the rate of cooling may provide an assortment of flatness results in accordance with the invention.

Further, by cooling the annealing environment, the substrate and support are cooled. Differences in cooling rate between substrate and support caused by any number of the factors listed above can be accommodated by slowing the cooling rate in the annealing environment. The factors which determine cooling rate along with the substrate and support materials determine how great a difference in cooling rate will be tolerated to obtain a flatness within the scope of the invention regardless of whether the substrate and support materials are the same or different. Cooling at a rate ranging from about 0.25° C./minutes to 1.5° C./minutes and preferably from about 0.5° C./minutes to about 1.0° C./minutes provides a more preferred flatness when preparing soda lime silica disks.

Further, controlled cooling may also be used to improve flatness in accordance with the method of the invention. By varying cooling rate for any respective substrate material, permanent stresses may be avoided.

Generally, soda lime silica substrates have been heated to about 500±5° C. and held at that temperature for over 12 hours. After this time, the substrate may be cooled at a rate ranging from about 0.25° C./minute to 1.5° C./minute until the substrate is at a temperature ranging from about 400° C. to 200° C. depending upon the material. The substrate may then be allowed to return to room temperature without environmental control.

B. The Disk or Substrate

Any number of nonmetallic substrates may be used in accordance with the invention which will provide the intended function. In the creation of hard disks or data memory or storage elements, generally, nonmetallic compositions which are nonorganic may be used such as carbides, nitrides, oxides, and phosphides or mixtures thereof. Nonmetallic compositions which may be used in particular include compositions such as silicon carbide, sapphire, titanium nitride, boron carbide, boron nitride, carbon, silicon nitride, and the like. Additionally, and in accordance with a more preferred aspect of the invention, the nonmetallic substrate may be glass, or glass/ceramic.

In these instances, a hard data memory or storage disk may be obtained by slicing a blank, edging that blank and then lapping the blank to the intended flatness and thickness. Generally, the thickness of the disk or blank will be about 1.0 mm to 0.70 mm for a disk which will be finished to 0.635 mm. The disks are polished to 0.635 mm after annealing and finished by the deposition of various layers such as an underlayer, a magnetic layer, and an overcoat.

Glass is generally a silicate material having a structure of silicon and oxygen where the silicon atom is tetrahedrally coordinated to surrounding oxygen atoms. Any number of other materials may be used to form glass such as boron oxide, silicon oxide, germanium oxide, aluminum oxide, boron oxide, phosphorus oxide, vanadium oxide, arsenic oxide, antimony oxide, zirconium oxide, titanium oxide, zinc oxide, lead oxide, aluminum oxide, thorium oxide, beryllium oxide, zirconium oxide, cadmium oxide, scandium oxide, lanthanum oxide, yttrium oxide, tin oxide, gallium oxide, indium oxide, thorium oxide, lead oxide, magnesium oxide, lithium oxide, lead oxide, zinc oxide, barium oxide, calcium oxide, strontium oxide, cadmium oxide, sodium oxide, cadmium oxide, potassium oxide, rubidium oxide, mercury oxide, and cesium oxide.

In the creation of a hard disk comprised of a glass substrate, the glass may be processed in accordance with the method of the invention and then finished in accordance with methods known to those of skill in the art. The glass may generally be finished by sputtering various layers onto the substrate in accordance with methods known to those of skill in the art.

In turn, glass/ceramic nonmetallic materials may be treated similarly. Glass/ceramic disks or substrate may be obtained from Corning Corporation under the tradenames Flint®, Memcor and Memcor II®. These materials tend to be silica-based glasses with oxides such as titanium dioxide, zirconium dioxide, and the like. Any oxide may be used which is not soluble in glass and will crystallize when the glass is fired.

In turn, glass/ceramics generally result from the melt formation of glass and ceramic materials by a conventional glass manufacturing techniques. Subsequently, the materials are heat treated to transform them into fine-grain crystalline materials. Typical glass/ceramics are, for example, β-quartz solid solution, $SiO_2$; β-quartz; lithium metasilicate, $Li_2O$—$SiO_2$; lithium disilicate, $Li_2O$—$2SiO_2$; β-spodumene solid solution; anatase, $TiO_2$; β-spodumene solid solution; rutile $TiO_2$; β-spodumene solid solution; mullite, $3Al_2O_3$—$2SiO_2$; β-spodumene cordierite, $2MgO$—$2Al_2O_3$—$5SiO_2$; spinel, $MgO$—$Al_2O_3$; MgO-stuffed; β-quartz; quartz, $SiO_2$, α-quartz solid solution, $SiO_2$; spinel, $MgO$—$Al_2O_3$; enstatite, $MgO$—$SiO_2$; fluorphlogopite solid solution, $KMg_3AlSi_3O_{10}F_2$; mullite, $3Al_2O_3$—$2SiO_2$; and, $(Ba, Sr, Pb)Nb_2O_6$. For example disk finishing may include an optional caustic etch.

Once processed in accordance with the invention, the glass/ceramic disk may also be finished in accordance with any number of methods known to those of skill in the art.

To create a data storage or a memory disk, the disk should be processed in accordance with the invention and then finished according to any method to those of skill in the art.

Figure 2:
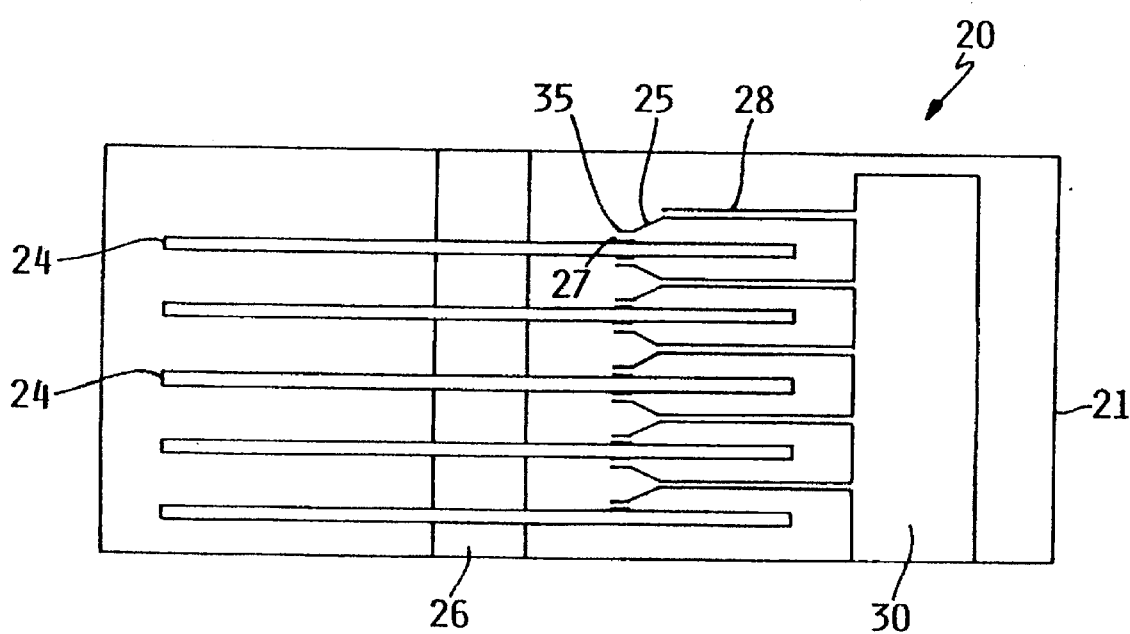
FIG. 2 is a side plan view of a data storage system comprising a plurality of data storage disks.

The disk may then be used in a data storage and retrieval devise such as that shown in FIGS. 1 and 2. Referring now to the drawings, and more particularly to FIGS. 1 and 2, there is shown a data storage system 20 with the cover 23 removed from the base 22 of the housing 21. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms 28, with each arm having one or more transducer 27 and slider body 35 assemblies mounted to a load beam 25 for reading and writing information to and from the data storage disks 24. The slider body 35 is typically designed as an aerodynamic lifting body that lifts the transducer 27 off of the surface of the disk 24 as the rate of spindle motor 26 rotation increases, and causes the transducer 27 to hover above the disk 24 on an air bearing or airflow patterns produced by high-speed disk rotation. A conformal lubricant may alternatively be disposed on the disk surface 24 to reduce static and dynamic friction between the slider body 35 and disk surface 24.

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

WORKING EXAMPLES

The following working examples are intended to be illustrative, but not limiting, of the claimed invention. The invention is limited only by the claims hereinafter appended.

Working Example 1

A hang anneal process was undertaken in accordance with the invention to compare three Pilkington disks which were at various stages of processing. A first disk (Example 1A)

comprising Pilkington soda lime glass (ready for application, already finished), was measured for cone height and total indicated run out. Similar calculations were made for a raw Pilkington disk ready for disk finishing (Example 1B). Finally, cone height and total indicated run out were measured for a disk (Example 1C) which had been subjected to the method of the invention which was ready for disk finishing.

Figure 3:
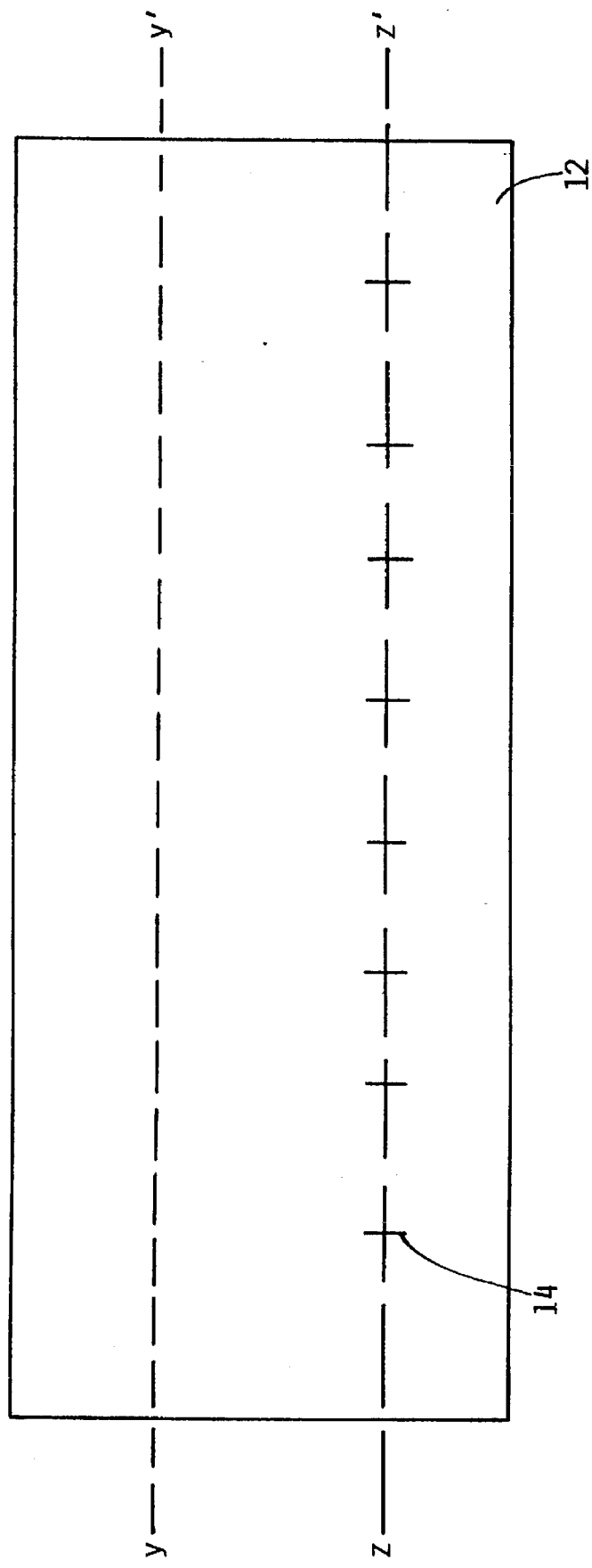
FIG. 3 is top plan view of a hang anneal support before shaping in accordance with one embodiment of the invention.
Figure 4:
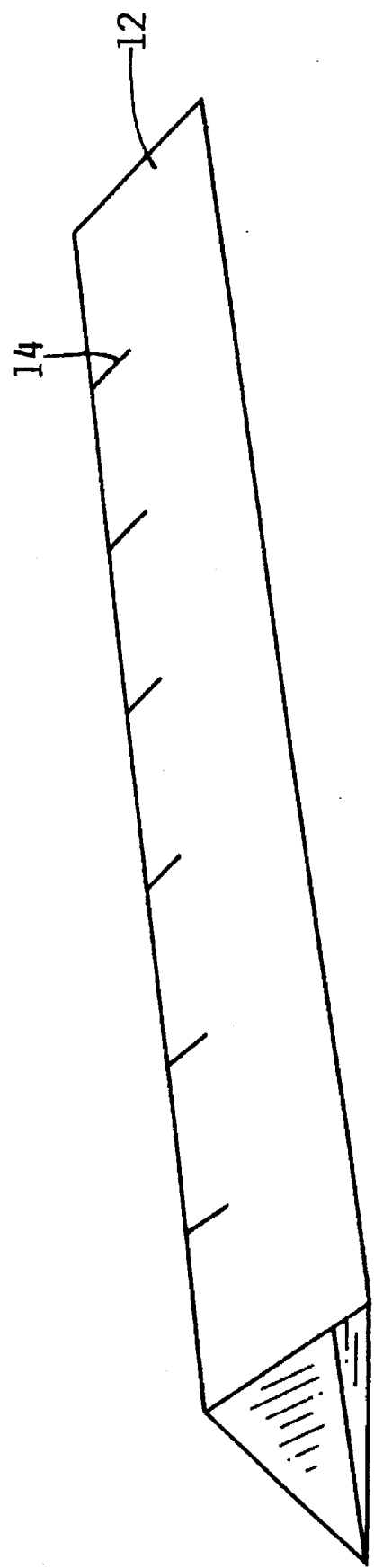
FIG. 4 is a perspective view of the hang anneal support, shown after shaping, depicted in FIG. 3.
Figure 5:
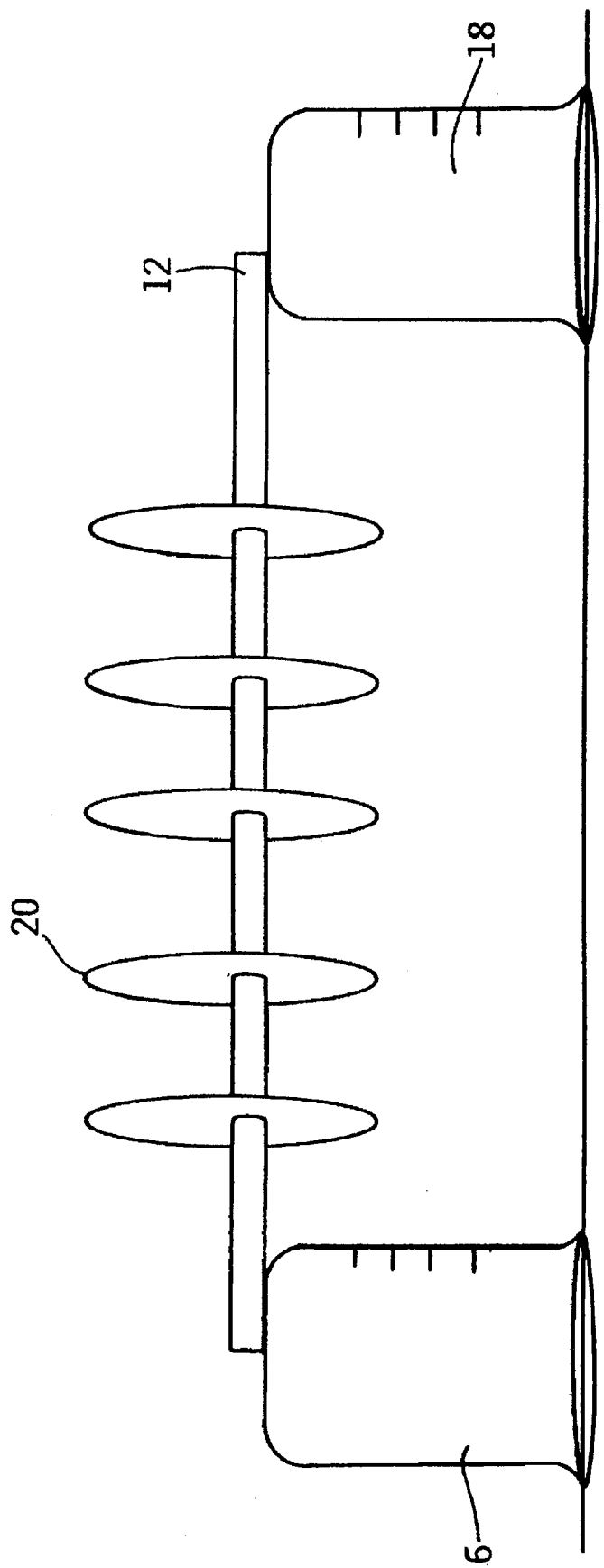
FIG. 5 is a front view of the hang anneal assembly used in Working Example 1.

Disk (Example 1C) was placed in an oven at room temperature. The disk was mounted on a support 12 composed of Inconel® (5 thousandths of an inch thick) which was folded at two axes Z-Z' and Y-Y' (FIG. 3), to make a three-sided support, (FIG. 4). The support has slits or openings 14 centrally located on axis Z-Z' which allow seating of disks during annealing. When placed in the oven, the support is held between two glass Pyrex® beakers, 16 and 18 (FIG. 5) onto which the disks 20 are suspended. The temperature of the oven was ramped up at a rate of 3.7° C./minutes to a temperature of 470° C. After reaching the 470° C. set point, the rate was changed to 1° C. per minute and then ramped up to 500° C. After reaching the 500° C. set point, the disk was annealed for 12 hours at this temperature. After completion of the 12 hour anneal, the disk was cooled at a rate of about 1.3° C. per minute to around 100° C. before opening the oven door. This was substantially the same cooling rate as the support cooling rate.

Figure 6:
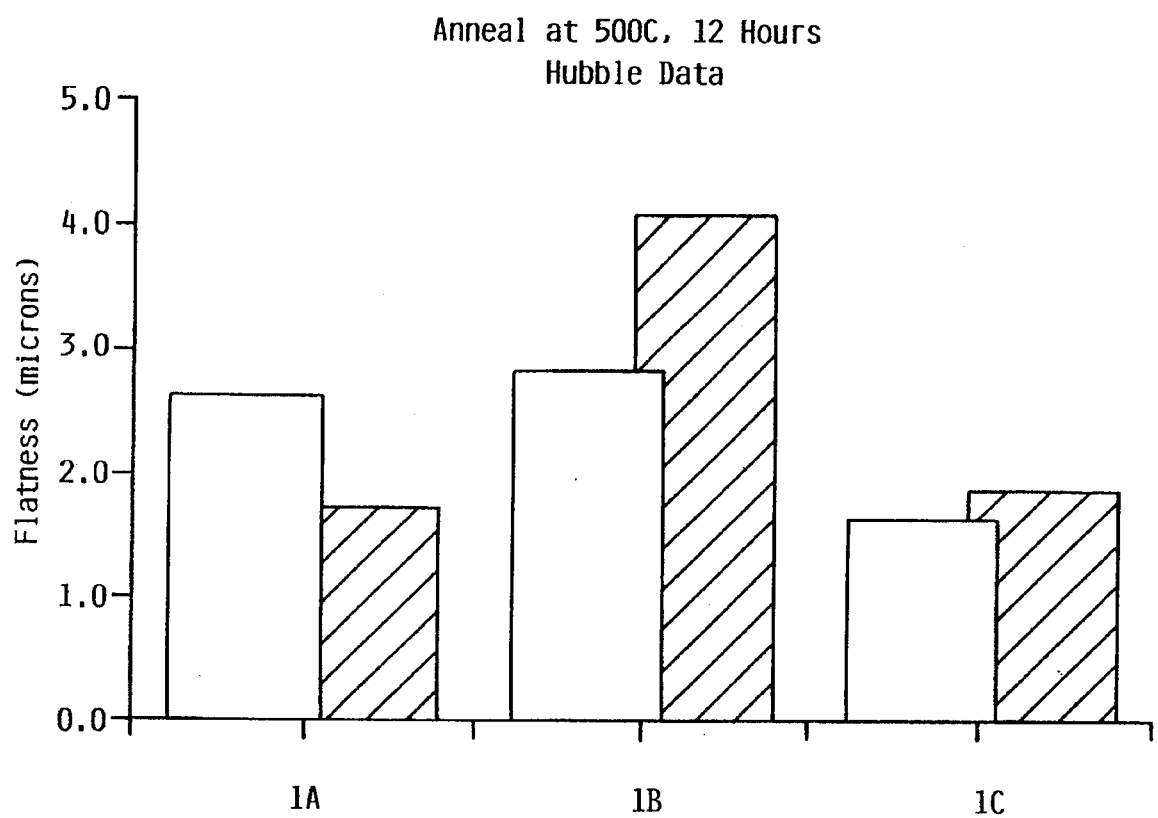
FIG. 6 is a tabular report of the data resulting from Working Example 1.

As can be seen from the results shown in FIG. 6, the anneal reduced TIR in the annealed substrate (Example 1C) as compared to the finished Pilkington substrate or the raw, unfinished substrate and the anneal also reduced coning when Example 1C was compared to the raw unfinished substrate, Example 1B.

Flatness Measurement

The flatness measurement tool is simply a mounted capacitance probe calibrated with known standards. A disk is positioned on three rounded pins 120 degrees apart. The three pins determine a plane. Data is taken in microns near the mid diameter at each 45 degrees as the disk is rotated 360 degrees. The disk is then flipped over and the process is repeated. The Total Indicated Run-out (TIR) is calculated by subtracting the minimum value from the maximum value for each side for the disk. This will give a TIR for each side of the disk. The cone height of the disk is calculated by taking the average of the eight reading for each side and then subtracting the numbers. Positive and negative numbers can be obtained indicating the direction of coning. To calculate the average cone height of a batch of parts the absolute value of the positive and negative numbers is used. The smaller the TIR and the cone height, the flatter the part.

There are commercial tools to measure the flatness of a disk. Some of these tools are Flatmaster, Zygo and Topo available from Wyko or Zygo which are based on light interferometry. A Tencor, which is based on a stylus, can also be used. All these instruments report the flatness in terms of TIR. The TIR is the Total Indicated Runout of the part, that is the distance between the highest reading and the lowest reading with respect to a reference plane representing zero TIR or flatness. Other means of determining flatness in the disk industry make use of capacitance probes. Capacitance probes are used on test stands in a manufacturing environment to accept or reject disks based on their flatness. The device used to characterize flatness in this invention is based on capacitance probes and is calibrated by using standards measured by light interferometry.

Working Example 2

During the annealing process, because of stress relaxation, the disk undergoes a measurable dimensional change. This dimensional change is repeatable and can easily be compensated for when the disk is inner diameter (ID) and outer diameter (OD) edged. An analysis of hole size change was evaluated to determine the relative change. The results reported for Examples 2A and 2B are number averages resulting from a single batch of substrates. Similarly, Examples 2C and 2D are number averages resulting from an additional batch of substrates. In each instance, Examples 2A through 2D, the number average resulted from separate respective batches of 25 disks. The results are reported in Table 2, below.

TABLE 2

|  | OD | ID |
| --- | --- | --- |
| Entire Process | | |
| Example 2A | −59 μm | −18 μm |
| Example 2B | −65 μm | −19 μm |
| Average | −62 μm | −19 μm |
| Anneal | | |
| Example 2A | −70 μm | −20 μm |
| Example 2B | −68 μm | −23 μm |
| Polish | | |
| Example 2C | No change | No change |
| Example 2D | −4 μm | 0 μm |
| Chemical Strengthening | | |
| Examples 2A and 2B (Average) | 11 μm | 2 μm |
| Examples 2C and 2D (Average) | 7 μm | 2 μm |

In two trial experiments the OD size decrease by 70 (Example 2A) and 68 microns (Example 2B), where as the ID decreased by 20 (Example 2A) and 23 microns (Example 2B). On repeated anneals the size of the disk did not change by a measurable amount.

Examples 2C and 2D were run to determine whether disk size (ID and OD) changed with polishing and chemical strengthening. The disk size does not change at polish (Examples 2C and 2D) but does so only slightly during the chemical strengthening process. During this same two run trial it was found that the OD increased by 11 and 7 micron and the ID increased by 2 and 4 microns. Having read this specification, one of skill in the art will realize that the ID and OD sizes may vary for disks of different size and composition.

The above discussion, examples and embodiments illustrate our current understanding of the invention. However, since many variations of the invention can be made without departing from the spirit and scope of the invention, the invention resides wholly in the claims hereafter appended.

We claim as our invention:

1. A glass disk resulting from a method comprising the steps of:
   (a) placing the substrate on a support, said substrate comprising a first material, said support comprising a second material;
   (b) heating said substrate to within the annealing range of the first material for a period of time effective to remove stresses within the first material; and
   (c) controllably cooling said substrate and said support so that said first material and said second material cool at a substantially equivalent rate.

2. A method for improving the flatness of nonmetallic disk substrates, said method comprising the steps of:

(a) placing the substrate on a support, said substrate comprising a first material, said support comprising a second material;

(b) heating said substrate to within the annealing range of the first material for a period of time effective to remove stresses within the first material; and (c) controllably cooling said substrate and said support so that said first material and said second material cool at a substantially equivalent rate.

3. The method of claim 2 wherein said first and second materials are the same.

4. The method of claim 2 wherein said first and second materials are different.

5. The method of claim 2 wherein said substrate comprises soda lime silica glass.

6. The method of claim 2 wherein said support comprises a nickel-iron alloy and the difference in cooling between the first and second materials is from about 0° C./minute to 3° C./minute.

7. The method of claim 2 wherein said nonmetallic substrate comprises a material selected from the group consisting of glass and glass/ceramic.

8. The method of claim 2 wherein said nonmetallic substrate comprises a material selected from the group consisting of a carbide compound, a nitrate compound, a phosphide compound, an oxide compound and mixtures thereof.

9. The method of claim 2 wherein said support comprises a refractory metal.

10. The method of claim 2 wherein said support comprises a nickel-iron alloy.

11. The method of claim 2 wherein said substrate comprises a soda lime silica glass disk, and is heated to a temperature of about 500±5° C., for a period of time ranging from about 2 hours to 12 hours.

12. The method of claim 11 wherein after heating said glass disk is cooled to room temperature at a rate ranging from about 0.25° C./minute to 1.5° C./minute.

13. The method of claim 2 wherein said substrate comprises a soda lime glass disk which is heated to about 500±5° C. for 12 hours and cooled to about 430° C. at a rate of about 0.5° C./minute after which the glass is cooled to room temperature.

14. A method for improving the flatness of a glass disk, said method comprising the steps of:

(a) mounting said glass disk on a support, said support comprising a refractory metal;

(b) heating said glass disk to at least about 500° C. for a period ranging from about 0.5 hours to 12 hours; and (c) controllably cooling said glass disk and said support so that said disk cools at a rate of about 0.25° C./minute to 1.5° C./minute to room temperature.

15. The method of claim 14 wherein said substrate and support are the same material.

16. The method of claim 14 wherein said substrate and support are different materials.

17. The method of claim 14 wherein said substrate comprises soda lime silica glass.

18. A hard disk memory element resulting from a method comprising the steps of:

(a) mounting said glass disk on a support, said support comprising a refractory metal;

(b) heating said glass disk to at least about 500° C. for a period ranging from about 0.5 hours to 12 hours; and (c) controllably cooling said glass disk and said support so that said disk cools at a rate of about 0.25° C./minute to 1.5° C./minute to room temperature.

19. The method of claim 17 wherein said glass disk is heated to about 500±5° C. for 12 hours and cooled to about 430° C. at a rate of about 0.5° C./minute after which the glass is cooled to room temperature.

20. The hard disk memory element of claim 19 comprising glass, said memory element having a flatness measured by a total indicated run of less than about 6 microns and a cone height of less than about 6 microns.

21. A data storage and retrieval device comprising the hard disk memory element of claim 20.

* * * * *